(12) United States Patent
Nida

(10) Patent No.: US 8,535,104 B1
(45) Date of Patent: Sep. 17, 2013

(54) MARINE VESSELS AND COOLING SYSTEMS FOR MARINE BATTERIES ON MARINE VESSELS

(75) Inventor: Nicholas E. Nida, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 250 days.

(21) Appl. No.: 13/095,537

(22) Filed: Apr. 27, 2011

(51) Int. Cl.
 *B63H 21/17* (2006.01)

(52) U.S. Cl.
 USPC .............................. 440/6; 62/3.61; 180/68.2

(58) Field of Classification Search
 USPC ............... 440/3, 6; 62/186, 239, 244, 259.2, 62/3.61; 180/68.1, 68.2; 429/7, 50, 62, 120
 See application file for complete search history.

(56) References Cited

U.S. PATENT DOCUMENTS

| | | | |
|---|---|---|---|
| 5,320,190 A | 6/1994 | Naumann et al. | |
| 5,577,747 A | 11/1996 | Ogawa et al. | |
| 5,937,664 A | 8/1999 | Matsuno et al. | |
| 6,840,050 B2 * | 1/2005 | Pode | 62/259.2 |
| 6,890,224 B2 * | 5/2005 | McCann | 440/6 |
| 7,220,154 B2 * | 5/2007 | Lawson | 440/38 |
| 2008/0060370 A1 | 3/2008 | Keene et al. | |
| 2009/0087727 A1 * | 4/2009 | Harada et al. | 429/120 |
| 2009/0280395 A1 | 11/2009 | Nemesh et al. | |
| 2010/0009246 A1 | 1/2010 | Maitre et al. | |
| 2010/0129154 A1 | 5/2010 | Cox | |
| 2010/0279152 A1 | 11/2010 | Payne | |
| 2010/0279153 A1 | 11/2010 | Payne | |

* cited by examiner

*Primary Examiner* — Lars A Olson
(74) *Attorney, Agent, or Firm* — Andrus, Sceales, Starke & Sawall, LLP

(57) ABSTRACT

A marine battery provides power to a marine vessel. A cooling system comprises a substantially air-tight housing; at least one battery disposed in the housing; a heat exchanger circulating cooling fluid through the housing; and a fan circulating cooling air along a series of flow paths comprising a first flow path across the heat exchanger and the at least one battery and a second flow path returning to the fan. In one example the cooling fluid comprises seawater.

18 Claims, 3 Drawing Sheets

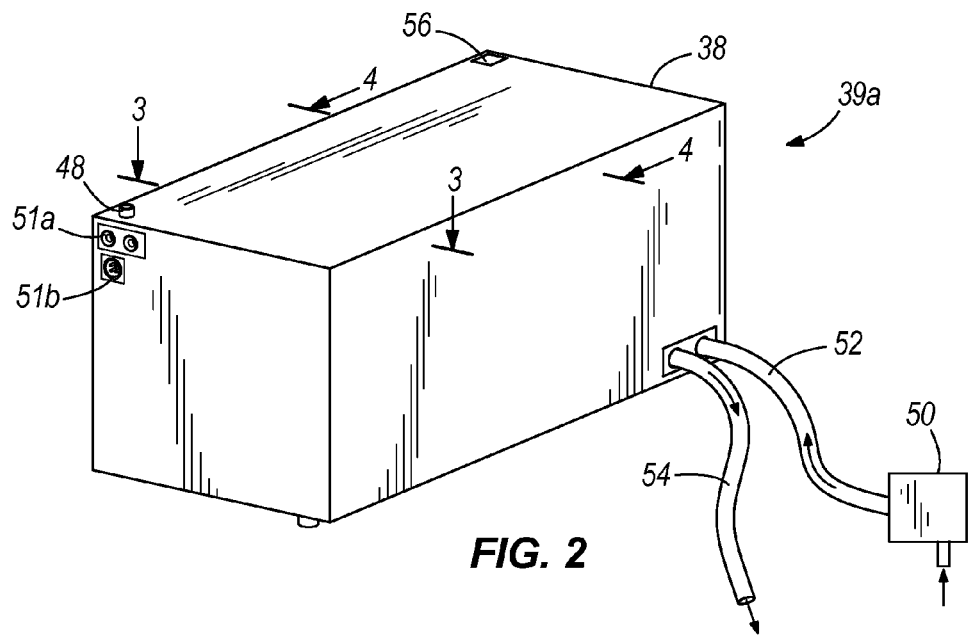
FIG. 2
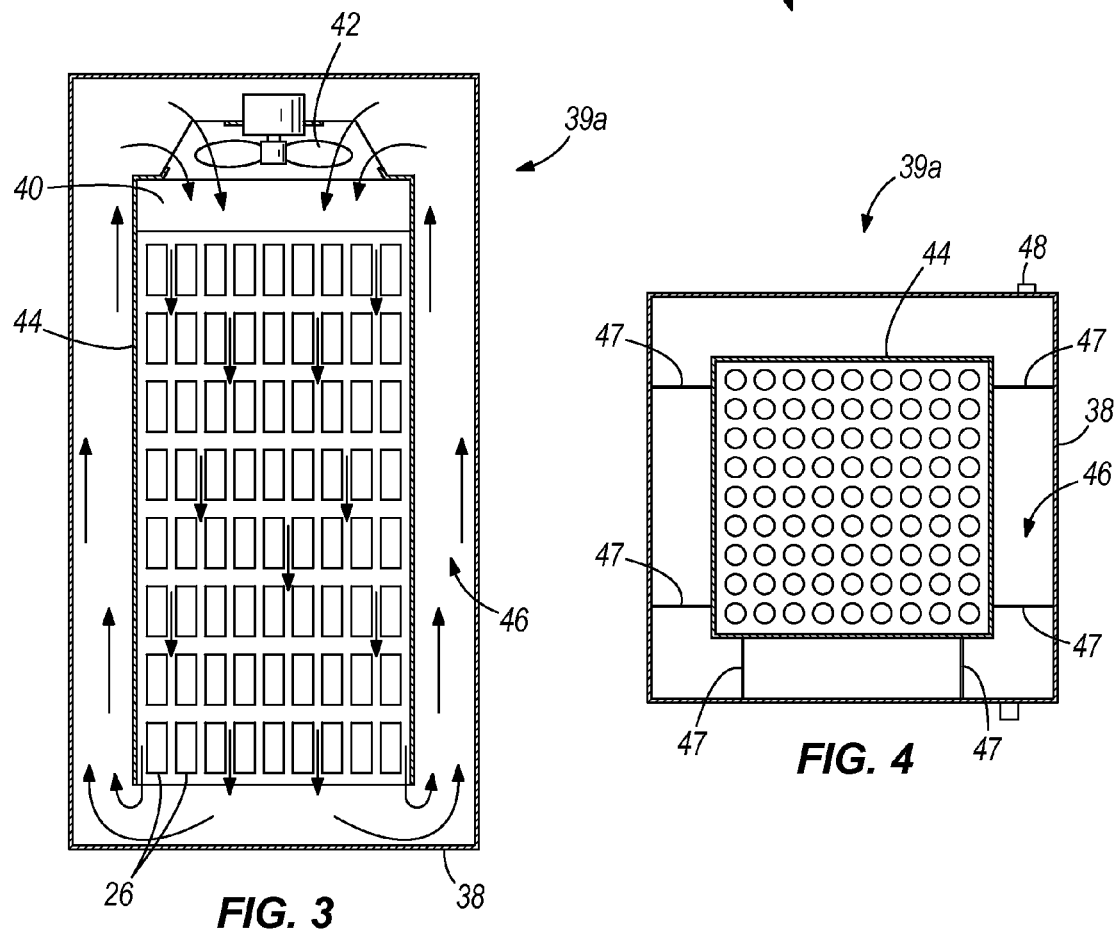
FIG. 3
FIG. 4

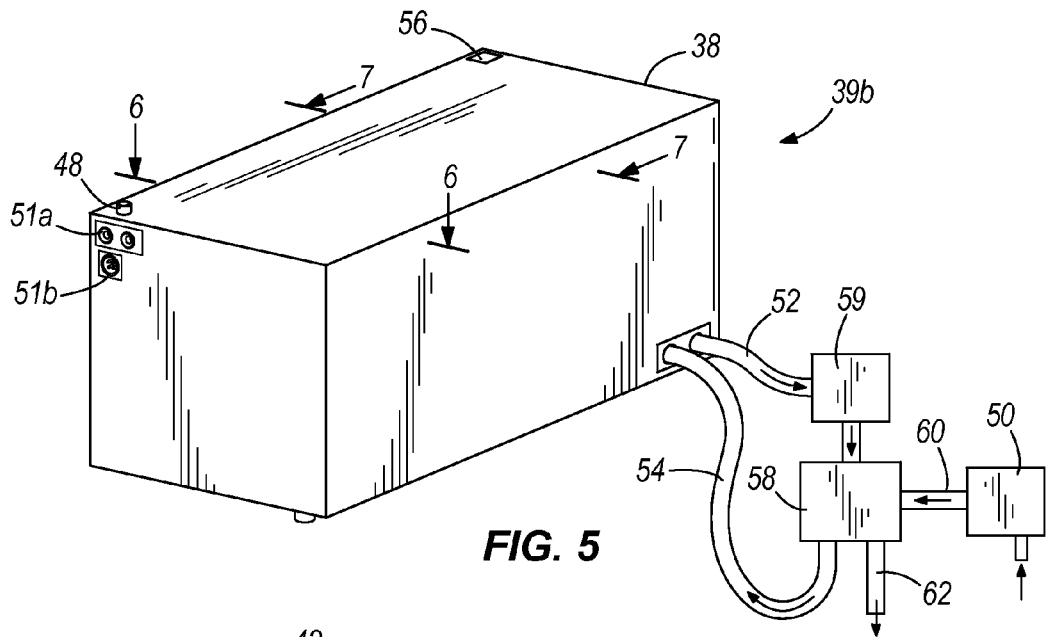
FIG. 5
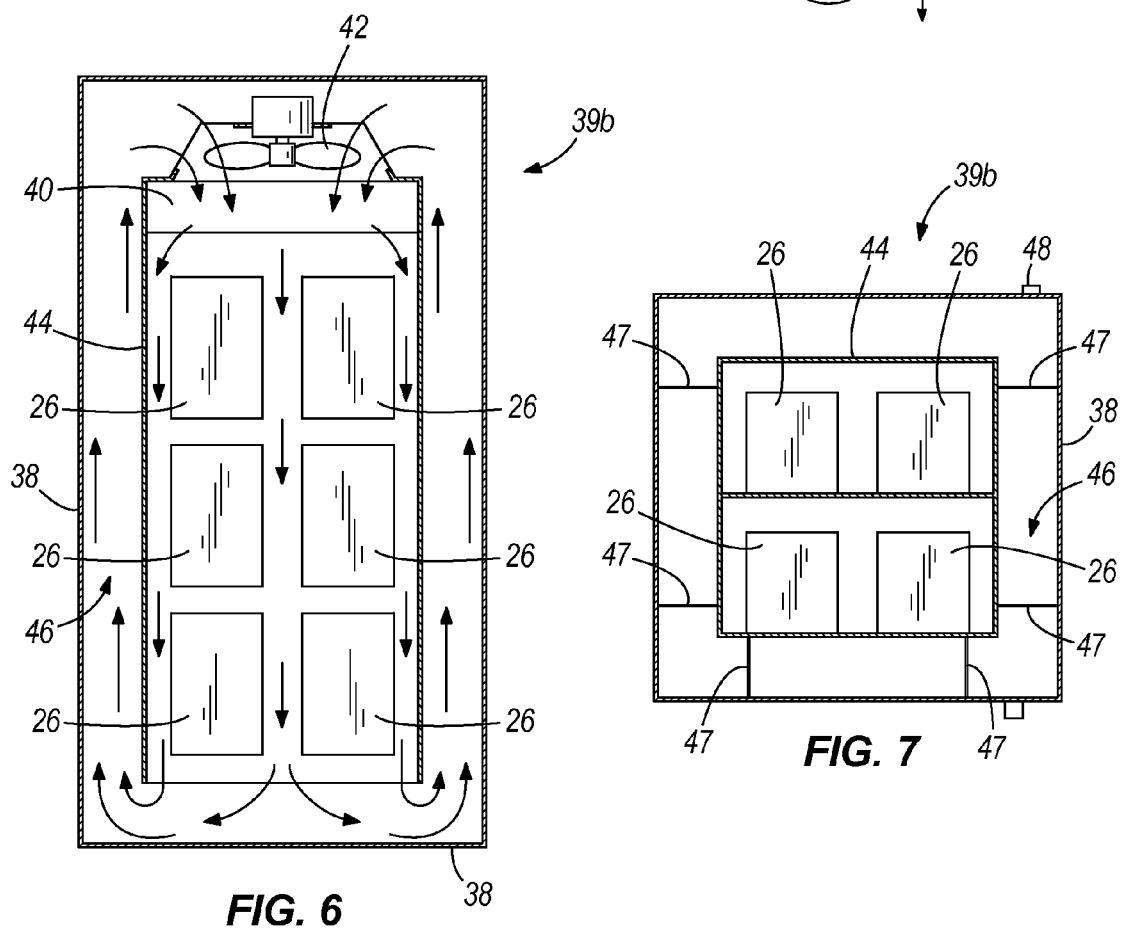
FIG. 6
FIG. 7

MARINE VESSELS AND COOLING SYSTEMS FOR MARINE BATTERIES ON MARINE VESSELS

FIELD

The present disclosure relates to marine vessels and batteries for marine vessels.

BACKGROUND

U.S. patent application Ser. No. 12/849,549, expressly incorporated herein in entirety by reference, discloses scalable marine propulsion systems wherein one or more batteries can be added or removed from a plurality of batteries already connected to the system without negatively affecting operation of the plurality of batteries or the remaining components of the system.

SUMMARY

During research and development of batteries including for example battery packs and battery cells for hybrid marine vessels, the present inventor has realized that a saltwater environment can have deleterious effects on the life and operation of the batteries. Further, the inventor has realized that warm environments, such as the environment in an engine room on the marine vessel, can also have deleterious effects on the life and operation of the batteries. Especially as hybrid marine vessels become more prevalent in the marine industry, the inventor has recognized a need for systems that reduce the negative effects the saltwater marine environment can have on the life and operation of batteries on marine vessels.

In one example, a cooling system for a marine battery comprises a substantially air-tight housing; at least one battery disposed in the housing; a heat exchanger circulating cooling fluid through the housing; and an air circulation device circulating cooling air along a series of flow paths comprising a first flow path across the heat exchanger and the at least one battery and a second flow path returning to the air circulation device.

In another example, a cooling system for a marine battery comprises a housing; at least one battery disposed in the housing; a heat exchanger disposed in the housing; a pump circulating seawater through the heat exchanger; and a fan circulating cooling air along a series of flow paths comprising a first flow path across the heat exchanger and the at least one battery and a second flow path returning to the fan.

In another example, a marine vessel comprises a marine propulsor that propels the marine vessel; an internal combustion engine that selectively powers the marine propulsor; an electric motor that selectively powers the marine propulsor; at least one battery providing power to the electric motor; an engine compartment wherein at least the engine and the at least one battery are disposed; a control circuit that controls operation of the engine and the motor according to a plurality of modes comprising an electric mode wherein the motor powers the marine propulsor and a hybrid mode wherein the engine powers the marine propulsor and provides power for recharging the at least one battery; a substantially air-tight housing containing the at least one battery; a heat exchanger circulating cooling fluid through the housing; and a fan circulating cooling air along a series of flow paths comprising a first flow path across the heat exchanger and the at least one battery and a second flow path returning to the fan. The housing separates air in the engine compartment from air surrounding the at least one battery so as to decrease deleterious effects of heat and salt on the at least one battery.

BRIEF DESCRIPTION OF DRAWINGS

FIG. 2 is a perspective view of a first example of a cooling system for a marine battery pack.

FIG. 3 is a view of section 3-3 taken in FIG. 3.

FIG. 4 is a view of section 4-4 taken in FIG. 3.

FIG. 5 is a perspective view of a second example of a cooling system for a marine battery pack.

FIG. 6 is a view of section 6-6 taken in FIG. 6.

FIG. 7 is a view of section 7-7 taken in FIG. 6.

DETAILED DESCRIPTION OF DRAWINGS

Figure 1:
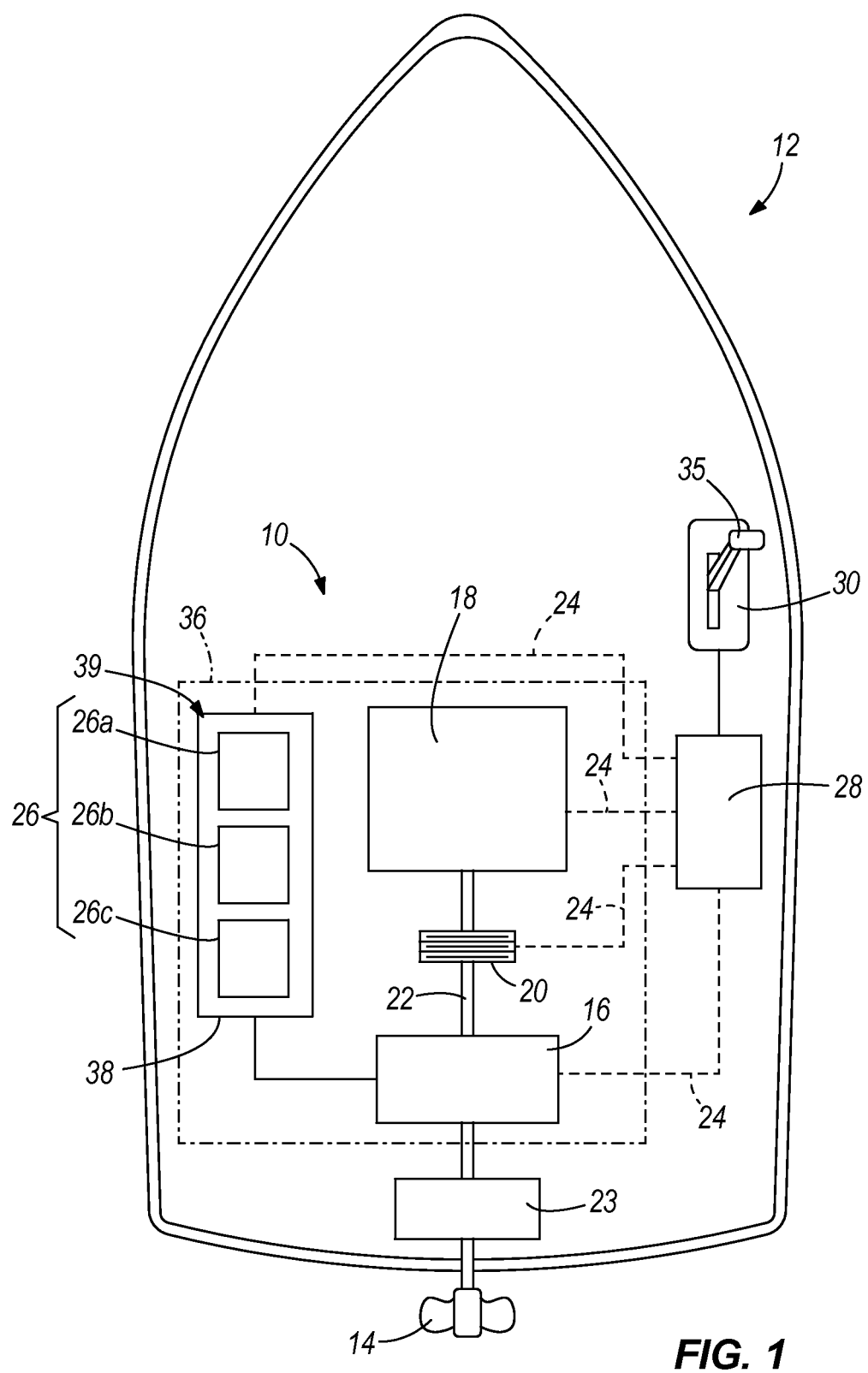
FIG. 1 is a schematic depiction of a marine vessel and a propulsion system for a marine vessel.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

FIG. 1 depicts a marine propulsion system 10 for a marine vessel 12. The system 10 includes among other things one or more propulsors 14 (collectively referred to herein as "propulsor"), which can include any type of device for propelling the marine vessel 12 including but not limited to one or more propellors (one is shown in FIG. 1), impellers, stern drives, pod drives, and/or the like. The propulsor 14 is selectively driven by one or more electric motors 16 (collectively referred to herein as "motor"), one or more internal combustion engines 18 (collectively referred to herein as "engine"), and a combination of the electric motor 16 and engine 18. In the example shown, the system 10 also includes one or more clutches 20 (collectively referred to herein as "clutch") for selectively connecting and disconnecting the engine 18 from a driveshaft 22 that extends from the engine 18 to a transmission 23 for driving the propulsor 14. The engine 18 can include a diesel engine or any other type of engine for providing power to the propulsor 14. The clutch 20 can include any type of clutch for connecting and disconnecting the engine 18 and driveshaft 22, such as for example a friction clutch, or a dog clutch because the speeds of the motor 16 and engine 18 are typically synchronized (i.e. substantially matched) before the clutch 20 is engaged or disengaged.

The motor 16 is located between the clutch 20 and transmission 23 and is configured to drive driveshaft 22 at the same time or separately from the engine 18. In the example shown, the driveshaft 22 extends through and forms part of the motor 16; however, arrangements where the motor 16 and driveshaft 22 are oriented differently with respect to each other or are separate components that are operatively connected are also contemplated and are part of this disclosure. Together, the engine 18, clutch 20, motor 16 and transmission 23 provide forward, neutral, and reverse operations of the propeller 14 in a "parallel" drive arrangement; however it should be recognized that the examples shown and described are not limiting and that the concepts discussed and claimed herein are applicable to other types of parallel and non-parallel hybrid marine propulsion configurations. Further, the concepts discussed and claimed herein are not limited for use with hybrid marine propulsion arrangements, such as the arrangement depicted in FIG. 1. On the contrary, the concepts discussed and claimed herein are applicable to any other type of marine propulsion system for propelling a marine vessel that include at least one battery.

The system 10 further includes a plurality of rechargeable storage batteries 26 (individually referred to as 26a, 26b, 26c), which are connected in electrical communication with the motor 16 and discharge current to power the motor 16. In FIG. 1, three batteries 26a, 26b, 26c are shown connected in series with each other and to system 10; however the number of batteries 26 and the configuration thereof can vary from that shown. One or more batteries 26 could be employed. In the examples shown, batteries 26a, 26b, 26c can each include conventional battery packs, battery modules, battery cells, a combination thereof, and/or the like.

In one exemplary arrangement, the motor 16 is operable as a generator to recharge batteries 26a, 26b, 26c. In this mode, referred to herein below as Hybrid Regeneration Mode, the motor 16 is connectable in torque transmitting relation with, and driven by, the engine 18, which in turn provides a supply of current for recharging batteries 26a, 26b, 26c. However, the motor does not need to provide the generation source for the batteries and an alternate generator that receives power from the engine 18 could be employed.

FIG. 1 depicts an inboard/outboard marine arrangement; however the concepts disclosed in this application are applicable to any type of marine propulsion system, such as for example, a stern drive arrangement or an outboard arrangement.

Referring to FIG. 1, the system 10 also includes a control circuit 28 having a programmable processor and optionally having a memory. The control circuit 28 comprises a controller area network 24 for operating the system 10 in a plurality of operational modes. The control circuit 28 is shown schematically and can optionally include a plurality of control circuit sections (not shown), each section optionally having a memory and a processor for sending and receiving electronic control signals, for communicating with other control circuits in the CAN 24, and for controlling operations of certain components in the system 10 such as the engine 18, clutch 20, and motor 16. Exemplary programming and operations of the control circuit 28 and its related sections are described in further detail in the incorporated U.S. patent application Ser. No. 12/849,549. In general, the control circuit 28 is configured to receive user inputs via the CAN 24 from a user input device 30. The user input device 30 is shown in FIG. 1 as a conventional combination throttle/shift lever 35. Alternately or additionally, the input device 30 can comprise a plurality of mode selection buttons, input touch screen, joy stick, and/or the like. Actuation of the user input device 30 is sensed by conventional sensors (not shown) and communicated to the control circuit 28 via the CAN 24 or other wired or wireless link.

During operation of the marine vessel 12, the control circuit 28 is programmed to switch amongst at least three modes of control, namely (1) an Engine Mode, wherein the engine 18 is connected to the propulsor 14 by the clutch 20 and all of the driving force to the propulsor 14 is provided by the engine 18; (2) an Electric Mode wherein the motor 16 is connected to the propulsor 14 and all of the driving force to the propulsor 14 is provided by the motor 16; and (3) a Hybrid Mode, including either or both of a Hybrid Assist Mode wherein both the engine 18 and the motor are connected to the propulsor 14 and the driving force to the propulsor 14 is provided by a combination of the engine 18 and the motor 16, and a Hybrid Regeneration Mode wherein the motor 16 is controlled to perform as a generator, thereby providing a recharge current to the batteries 26a, 26b, 26c. The latter situation occurs, for example, when both the motor 16 and engine 18 are connected in parallel via the driveshaft 22. Which mode of operation is utilized at any given time can be operated based upon user inputs provided by the user input device 30, or alternately can depend upon operator desired future performance capabilities of the system 10 and/or specific operating conditions of the vessel 12, as described in the incorporated U.S. patent application Ser. No. 12/849,549.

The system 10 disclosed herein is configured to provide switching between various modes of operation while the engine 18 is running and/or while the motor 16 is running and with the transmission 23 in neutral or in gear. For example, it is often desirable to switch into Electric Mode when operating the vessel 12 at low speeds to thereby provide quieter vessel operation and more fuel efficient vessel operation. It is often desirable to switch into Hybrid Regeneration Mode when the power of the plurality of batteries 26 is low to thereby draw recharging current from the engine 18.

As stated above, during research and development of batteries (such as battery packs, battery modules and/or battery cells) for marine vessels, the present inventors have realized that air in a salt water environment can have deleterious effects on the life and operation of batteries. Further, the inventors have realized that warm environments, such as the environment in an engine room on the marine vessel, can also have deleterious effects on the life and operation of the batteries. To limit or decrease the deleterious effects, the inventors have developed improved cooling systems for marine batteries and for marine vessels, examples of which are described herein below. Although the examples disclosed herein include implementation of cooling systems on the hybrid marine propulsion system described herein above, the concepts disclosed and claimed herein can be implemented with other types of marine propulsion systems and vessels.

Referring to FIG. 1, the batteries 26 are disposed on the marine vessel 12 in a bilge or engine compartment 36 also containing the engine 18, and motor 16. Heat from the engine 18 causes the engine compartment 36 to have relatively high temperature compared to ambient temperature. Further, the marine vessel 12 is used in a salt water environment, the air in the engine compartment 36 can have a relatively high salt content which often condenses on the propulsion system machinery and equipment, including the engine 18 and batteries 26. To limit the degrading effects of the heat and salt on the performance of the batteries 26, a cooling system 39 is provided. The cooling system 39 includes a substantially air tight housing 38 containing the batteries 26. The configuration and contents of the housing 38 can vary. Two non-limiting examples of the cooling system 39 are provided in FIGS. 2-4 and 5-7, as described herein below and referred to as 39a and 39b.

Referring to the system 39a shown in FIGS. 2-4, a heat exchanger 40 is configured to circulate cooling fluid into and out of the housing 38. The heat exchanger can take various forms and in the example shown includes a radiator. A fan 42 is positioned adjacent the heat exchanger 40. A shroud 44 is disposed around the batteries 26 and defines part of a flow path for cooling air circulated by the fan 42. The batteries 26 are spaced apart in the shroud 44 and thus defined various flow channels therebetween, which together form part of the noted flow path for cooling air. The fan 42 circulates cooling air in the substantially air tight housing 38 first through the noted flow path across the heat exchanger 40 and the batteries 26 and then through a second flow path returning to the fan via the space 46 between the shroud 44 and the interior of housing 38. In the example shown, several support members 47 extend inwardly from the interior of housing 38 and support the shroud 44 apart from the housing 38 to define the space 46 therebetween.

As shown in FIGS. 2 and 4, a valve 48 is optionally provided for venting cooling air from the interior of housing 38. The valve 48 can take various forms, and selectively vents cooling air from inside the housing 38 when a differential pressure between the cooling air in the housing 38 and the air surrounding the housing 38 exceeds a certain amount, so as to avoid overpressure in the housing 38.

In the example of FIGS. 2-4, the cooling fluid is sea water drawn from the body of water in which the marine vessel 26 is operated. The sea water can be pumped by a pump 50 located for example at the hull of the vessel 26 to the heat exchanger 40 via an inlet tube 52. After circulation through the heat exchanger 40, the sea water can be discharged back to the body of water via a discharge tube 54. In use, the fan 42 blows warm air in the housing 38 across the heat exchanger 40, which carries relatively cool sea water. Heat from the air blown by the fan 42 is exchanged with the relatively cold heat exchanger 40 and providing relatively cool air across the batteries 26, thus cooling the batteries. As the air returns along the second noted flow path it is warmed and then cooled again by the above process.

In one example, the control circuit 28 can optionally be configured to control operation of the fan 42 and pump 50 and to receive signals from a temperature sensor 56. The CAN 24 is connected to the system 39a via the network 24 at connection terminals 51a, 51b. The control circuit 28 can be configured to monitor the temperature of the air inside the housing 38 via signals from the temperature sensor 56 and then control operation of the fan 42 and optionally the pump 50 to maintain the air inside the housing 38 within a predetermined temperature range.

FIGS. 5-7 depict another example of a cooling system 39b. Like reference numbers are applied to structure that corresponds to the example described above in FIGS. 2-4. In the example of FIGS. 5-7, the heat exchanger 40 circulates cooling fluid in a closed loop. A second heat exchanger 58 and pump 59 is provided for exchanging heat between the cooling fluid in the closed circuit and sea water pumped from the body of water in which the marine vessel 12 exists via inlet line 60 and outlet line 62. The embodiment shown in FIGS. 5-7 includes batteries that are configured as battery modules, in contrast to the battery cells shown in FIGS. 2-4. Other battery configurations are possible.

The present disclosure thus provides examples of a cooling system for a marine battery. The cooling system includes a substantially airtight housing and at least one battery disposed in the housing. Means for circulating cooling fluid through the housing and for circulating cooling air along a series of flow paths including a first flow path across the means for circulating cooling fluid and the at least one battery and a second flow path returning to the means for circulating cooling air is provided.

What is claimed is:

1. A cooling system for a marine battery, the cooling system comprising:
 a substantially air-tight housing;
 at least one battery disposed in the housing;
 a heat exchanger circulating cooling fluid through the housing; and
 an air circulation device circulating cooling air along a series of flow paths comprising a first flow path across the heat exchanger and the at least one battery and a second flow path returning to the air circulation device;
 wherein the cooling fluid comprises seawater.

2. A cooling system according to claim 1, wherein the heat exchanger comprises a radiator.

3. A cooling system according to claim 2, comprising a pump pumping the cooling fluid through the radiator.

4. A cooling system according to claim 1, wherein the air circulation device comprises a fan.

5. A cooling system according to claim 1, comprising a shroud disposed around the at least one battery and defining the first flow path.

6. A cooling system according to claim 5, wherein the heat exchanger is disposed in the first flow path between the fan and the shroud.

7. A cooling system according to claim 1, comprising a control circuit controlling at least one of the pump and the fan to maintain a certain temperature range in the housing.

8. A cooling system for a marine battery, the cooling system comprising:
 a substantially air-tight housing;
 at least one battery disposed in the housing;
 a heat exchanger circulating cooling fluid through the housing; and
 an air circulation device circulating cooling air along a series of flow paths comprising a first flow path across the heat exchanger and the at least one battery and a second flow path returning, to the air circulation device;
 wherein the heat exchanger comprises a radiator;
 a pump pumping the cooling fluid through the radiator;
 wherein the radiator circulates cooling fluid that is cooled by seawater.

9. A cooling, system according to claim 8, comprising a second heat exchanger circulating the seawater to cool the cooling fluid.

10. A cooling system for a marine battery, the cooling system comprising:
 a substantially air-tight housing;
 at least one battery disposed in the housing;
 a heat exchanger circulating cooling fluid through the housing; and
 an air circulation device circulating cooling air along a series of flow paths comprising a first flow path across the heat exchanger and the at least one battery and a second flow path returning to the air circulation device;
 comprising a valve venting cooling air from the housing.

11. A cooling system according to claim 10, wherein the valve selectively vents cooling air from the housing when a differential pressure between the cooling air in the housing and air surrounding the housing exceeds a certain amount.

12. A cooling system for a marine battery, the cooling system comprising:
 a housing;
 at least one battery disposed in the housing;
 a heat exchanger disposed in the housing;
 a pump circulating seawater through the heat exchanger; and
 a fan circulating cooling air along a series of flow paths comprising a first flow path across the heat exchanger and the at least one battery and a second flow path returning to the fan.

13. A cooling system according to claim 12, wherein the housing is substantially air-tight.

14. A cooling system according to claim 13, comprising a valve selectively venting cooling air from the housing.

15. A cooling system according to claim 14, comprising a control circuit controlling at least one of the pump and the fan to maintain a temperature range in the housing.

16. A marine vessel comprising:
a marine propulsor that propels the marine vessel;
an internal combustion engine that selectively powers the marine propulsor;
an electric motor that selectively powers the marine propulsor;
at least one battery providing power to the electric motor;
an engine compartment, wherein at least the engine and the at least one battery are disposed in the engine compartment;
a control circuit that controls operation of the engine and the motor according to a plurality of modes comprising an electric mode wherein the motor powers the marine propulsor and a hybrid mode wherein the engine powers the marine propulsor and provides power for recharging the at least one battery;
a substantially air-tight housing containing the at least one battery;
a heat exchanger circulating cooling fluid through the housing; and
a fan circulating cooling air along a series of flow paths comprising a first flow path across the heat exchanger and the at least one battery and a second flow path returning, to the fan;
wherein the housing separates air in the engine compartment from air surrounding the at least one battery so as to decrease deleterious effects of heat and salt in the engine compartment on the at least one battery.

17. A marine vessel according to claim 16, wherein the cooling fluid comprises seawater.

18. A marine vessel according to claim 17, comprising a valve, venting cooling air from the housing.

* * * * *